(12) United States Patent
Oshima et al.

(10) Patent No.: US 8,293,832 B2
(45) Date of Patent: Oct. 23, 2012

(54) CONJUGATED DIENE POLYMER, CONJUGATED DIENE POLYMER COMPOSITION, AND METHOD FOR PRODUCING CONJUGATED DIENE POLYMER

(75) Inventors: Mayumi Oshima, Kanagawa (JP); Mana Ito, Tokyo (JP); Katsunari Inagaki, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/095,045

(22) Filed: Apr. 27, 2011

(65) Prior Publication Data

US 2011/0275755 A1 Nov. 10, 2011

(30) Foreign Application Priority Data

May 6, 2010 (JP) ................................. 2010-106185
Aug. 11, 2010 (JP) ................................. 2010-180021

(51) Int. Cl.
*C08K 3/34* (2006.01)
*C08F 222/40* (2006.01)

(52) U.S. Cl. ...................................... 524/492; 524/548

(58) Field of Classification Search .................... 524/492
See application file for complete search history.

(56) References Cited

U.S. PATENT DOCUMENTS

| 3,891,721 A * | 6/1975 | Prudence ...................... 525/271 |
| 5,219,938 A * | 6/1993 | Imai et al. ..................... 525/102 |
| 2005/0203251 A1 * | 9/2005 | Oshima et al. ................ 525/192 |

FOREIGN PATENT DOCUMENTS

JP 63-186748 A 8/1988
JP 07-102117 A 4/1995

* cited by examiner

*Primary Examiner* — Hui Chin
(74) *Attorney, Agent, or Firm* — Sughrue Mion, PLLC

(57) ABSTRACT

A conjugated diene polymer obtained by reacting one end of a conjugated diene polymer having a monomer unit based on a conjugated diene and a monomer unit based on a compound represented by Formula (1) with a compound represented by Formula (2) wherein the content of the monomer unit based on the compound represented by Formula (1) is 0.01 to 20% by weight relative to 100% by weight of the total amount of the monomer unit in the conjugated diene polymer:

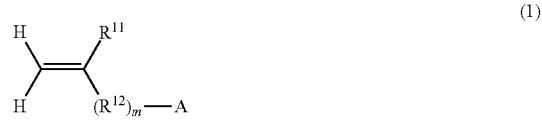

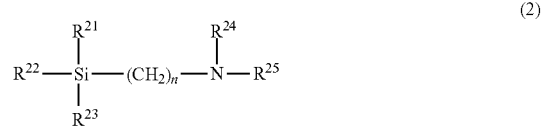

wherein $R^{11}$, $R^{12}$, $R^{21}$-$R^{25}$, A, m and n are as defined in the specification.

3 Claims, No Drawings

CONJUGATED DIENE POLYMER, CONJUGATED DIENE POLYMER COMPOSITION, AND METHOD FOR PRODUCING CONJUGATED DIENE POLYMER

TECHNICAL FIELD

The present invention relates to a conjugated diene polymer, a conjugated diene polymer composition, and a method for producing a conjugated diene polymer.

BACKGROUND ART

In recent years, with the growing concern over environmental problems, the demand for good fuel economy for automobiles has been becoming stronger, and there is also a demand for excellent fuel economy for rubber compositions used for automobile tires. As rubber compositions for automobile tires, a rubber composition containing a conjugated diene polymer such as polybutadiene or butadiene-styrene copolymer and a reinforcing agent is used.

As polymers for enhancing fuel economy, and polymer compositions having good fuel economy, for example, JP-A-7-102117 (JP-A denotes a Japanese unexamined patent application publication) proposes a polymer obtained by the radical polymerization of butadiene, styrene and a vinyl pyridine using an organic peroxide as an initiator, and a polymer composition containing the polymer and carbon black. JP-A-63-186748 proposes a polymer obtained by the living anionic polymerization of butadiene and styrene using an organic peroxide as an initiator, and then the modification of one end of the obtained polymer with a silane compound containing a dialkylamino group and an alkoxy group, and a polymer composition containing the polymer and carbon black.

SUMMARY OF THE INVENTION

Problems to be Solved by the Invention

However, the polymer compositions using a conventional conjugated diene polymer are unsatisfactory in terms of abrasion resistance.

Under such circumstances, an object of the present invention is to provide a conjugated diene polymer capable of giving a polymer composition excellent in abrasion resistance, a polymer composition containing the conjugated diene polymer and a reinforcing agent, and a method for producing the conjugated diene polymer.

Means for Solving the Problems

A first embodiment of the present invention is directed to a conjugated diene polymer obtained by reacting one end of a conjugated diene polymer having a monomer unit based on a conjugated diene and a monomer unit based on a compound represented by Formula (1) with a compound represented by Formula (2) wherein the content of the monomer unit based on the compound represented by Formula (1) is 0.01 to 20% by weight relative to 100% by weight of the total amount of the monomer unit in the conjugated diene polymer:

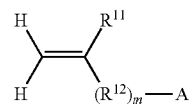

wherein $R^{11}$ represents a hydrogen atom or a hydrocarbyl group, m is 0 or 1, $R^{12}$ represents a hydrocarbylene group, and A represents a nitrogen-containing heterocyclic group.

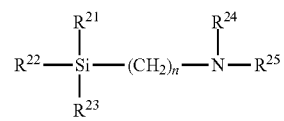

wherein n represents an integer of 1 to 10; $R^{21}$, $R^{22}$ and $R^{23}$ independently represent a hydrocarbyl group or a hydrocarbyloxy group, and at least one of $R^{21}$, $R^{22}$ and $R^{23}$ is a hydrocarbyloxy group; $R^{24}$ and $R^{25}$ independently represent a hydrogen atom or a hydrocarbyl group that may have a nitrogen atom and/or an oxygen atom, or $R^{24}$ and $R^{25}$ are bonded to represent a hydrocarbylene group that may have a nitrogen atom and/or an oxygen atom, or $R^{24}$ and $R^{25}$ form one group representing a group bonded to a nitrogen atom by a double bond.

A second embodiment of the present invention is directed to a conjugated diene polymer composition containing the conjugated diene polymer and a reinforcing agent.

A third embodiment of the present invention is directed to a method for producing a conjugated diene polymer having steps A and B below.

step A: polymerizing a monomer component containing a conjugated diene and a compound represented by Formula (1) below by an alkali metal catalyst in a hydrocarbon solvent using 0.01 to 20% by weight of the compound represented by Formula (1) (relative to 100% by weight of the total amount of the monomer component used), thereby giving a polymer having the alkali metal derived from the alkali metal catalyst at least at one end of a polymer chain having a monomer unit based on the conjugated diene and a monomer unit based on the compound represented by Formula (1) below.

step B: reacting the polymer obtained in step A and a compound represented by Formula (2) below.

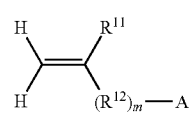

wherein $R^{11}$ represents a hydrogen atom or a hydrocarbyl group, m is 0 or 1, $R^{12}$ represents a hydrocarbylene group, and A represents a nitrogen-containing heterocyclic group.

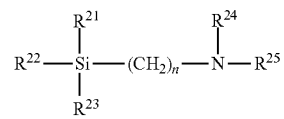

wherein n represents an integer of 1 to 10; $R^{21}$, $R^{22}$ and $R^{23}$ independently represent a hydrocarbyl group or a hydrocarbyloxy group, and at least one of $R^{21}$, $R^{22}$ and $R^{23}$ is a hydrocarbyloxy group; $R^{24}$ and $R^{25}$ independently represent a hydrogen atom or a hydrocarbyl group that may have a nitrogen atom and/or an oxygen atom, or $R^{24}$ and $R^{25}$ are bonded to represent a hydrocarbylene group that may have a nitrogen atom and/or an oxygen atom, or $R^{24}$ and $R^{25}$ form one group representing a group bonded to a nitrogen atom by a double bond.

Mode for Carrying Out the Invention

The conjugated diene polymer of the invention is a conjugated diene polymer obtained by reacting one end of a conjugated diene polymer having a monomer unit based on a conjugated diene and a monomer unit based on a compound represented by Formula (1) with a compound represented by Formula (2):

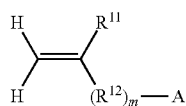

(1)

wherein $R^{11}$ represents a hydrogen atom or a hydrocarbyl group, m is 0 or 1, $R^{12}$ represents a hydrocarbylene group, and A represents a nitrogen-containing heterocyclic group:

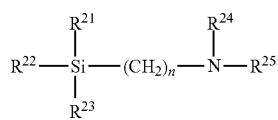

(2)

wherein n represents an integer of 1 to 10; $R^{21}$, $R^{22}$ and $R^{23}$ independently represent a hydrocarbyl group or a hydrocarbyloxy group, and at least one of $R^{21}$, $R^{22}$ and $R^{23}$ is a hydrocarbyloxy group; $R^{24}$ and $R^{25}$ independently represents a hydrogen atom or a hydrocarbyl group that may have a nitrogen atom and/or an oxygen atom, or $R^{24}$ and $R^{25}$ are bonded to represent a hydrocarbylene group that may have a nitrogen atom and/or an oxygen atom, or $R^{24}$ and $R^{25}$ form one group representing a group bonded to a nitrogen atom by a double bond.

In the present specification, the hydrocarbyl group represents a hydrocarbon residue. The hydrocarbyloxy group represents a group formed by substituting a hydrogen atom of a hydroxyl group by a hydrocarbyl group. The hydrocarbylene group represents a divalent hydrocarbon residue. The nitrogen-containing heterocyclic group represents a group formed by removing one hydrogen atom from a carbon atom of the heterocycle of a compound having a nitrogen-containing heterocycle. Meanwhile, the nitrogen-containing heterocycle represents a heterocycle having a nitrogen atom as a hetero atom constituting the ring.

Examples of the conjugated dienes include 1,3-butadiene, isoprene, 1,3-pentadiene, 2,3-dimethyl-1,3-butadiene and 1,3-hexadiene etc., which are used in one kind or more. Preferable conjugated dienes include 1,3-butadiene and isoprene.

$R^{11}$ represents a hydrogen atom or a hydrocarbyl group.

Examples of the hydrocarbyl groups of $R^{11}$ include an alkyl group, an alkenyl group etc. Examples of the alkyl groups include a methyl group, an ethyl group, a n-propyl group, an isopropyl group, a n-butyl group, a sec-butyl group and a tert-butyl group etc., and a methyl group is preferable. Examples of the alkenyl groups include a vinyl group, an allyl group, a 1-propenyl group, a 1-methylethenyl group etc. As the hydrocarbyl group, a vinyl group is preferable.

As $R^{11}$, a hydrogen atom, a methyl group or a vinyl group is preferable.

Examples of the hydrocarbylene groups of $R^{12}$ include an alkylene group, an arylene group, a group formed by bonding an arylene group with an alkylene group, etc.

Examples of the alkylene groups include a methylene group, an ethylene group, a trimethylene group etc. As the alkylene group, a methylene group or an ethylene group is preferable.

Examples of the arylene groups include a phenylene group, a naphthylene group, a biphenylene group etc. As the arylene group, a phenylene group is preferable.

Examples of the group formed by bonding an arylene group with an alkylene group include a group formed by bonding a phenylene group with an alkylene group, a group formed by bonding a naphthylene group with an alkylene group, and a group formed by bonding a biphenylene group and an alkylene group. Among them, a group formed by bonding a phenylene group with an alkylene group is preferable.

Moreover, in the group formed by bonding an arylene group with an alkylene group, preferably a carbon atom of the arylene group of the group is bonded to a carbon atom to which $R^{11}$ of formula (1) is bonded.

The group formed by bonding a phenylene group with an alkylene group (a phenylene-alkylene group) includes a para-phenylene-alkylene group (for example, a group represented by Formula (a) below), a meta-phenylene-alkylene group (for example, a group represented by Formula (b) below) and an ortho-phenylene-alkylene group (for example, a group represented by Formula (c) below), depending on the position of a carbon atom from which a hydrogen atom is removed on a benzene ring and the position of a carbon atom to which the alkylene group is bonded on the benzene ring.

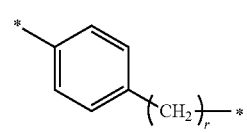

(a)

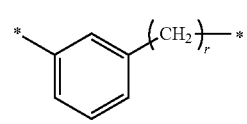

(b)

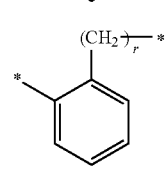

(c)

wherein r represents an integer of 1 to 5, and * denotes a bonding position.

The groups formed by bonding an arylene group with an alkylene group include preferably a group formed by bonding a phenylene group with an alkylene group (a phenylene-alkylene group), more preferably a group represented by Formula (a) above, a group represented by Formula (b) above and a group represented by Formula (c) above, yet more preferably a group represented by Formula (a) above and a group represented by Formula (b) above, and particularly preferably a para-phenylene-methylene group (a group represented by Formula (a) in which r=1), a meta-phenylene-methylene group (a group represented by Formula (b) in which r=1), a para-phenylene-ethylene group (a group represented by Formula (a) in which r=2), and a meta-phenylene-ethylene group (a group represented by Formula (b) in which r=2).

Examples of the nitrogen-containing heterocyclic groups of A include a nitrogen-containing alicyclic heterocyclic group and a nitrogen-containing aromatic heterocyclic group.

Examples of the nitrogen-containing alicyclic heterocyclic groups of A include a group having a nitrogen atom alone as a hetero atom constituting the ring, a group having a nitrogen atom and an oxygen atom as hetero atoms constituting the ring, a group having a nitrogen atom and a sulfur atom as hetero atoms constituting the ring, etc.

Examples of the nitrogen-containing alicyclic heterocyclic groups having a nitrogen atom alone as a hetero atom constituting the ring include a group having an aziridine ring, a group having an azetidine ring, a group having a pyrrolidine ring, a group having a piperidine ring, a group having a hexamethyleneimine ring, a group having an imidazolidine ring, a group having a piperazine ring, a group having a pyrazolidine ring, etc.

Examples of the groups having an aziridine ring include an N-alkyl-2-aziridinyl group.

Examples of the groups having an azetidine ring include an N-alkyl-2-azetidinyl group and an N-alkyl-3-azetidinyl group.

Examples of the groups having an pyrrolidine ring include an N-alkyl-2-pyrrolidinyl group and an N-alkyl-3-pyrrolidinyl group.

Examples of the groups having a piperidine ring include an N-alkyl-2-piperidinyl group, an N-alkyl-3-piperidinyl group and an N-alkyl-4-piperidinyl group.

Examples of the groups having a hexamethyleneimine ring include an N-alkyl-2-hexamethyleneimino group, an N-alkyl-3-hexamethyleneimino group and an N-alkyl-4-hexamethyleneimino group.

Examples of the groups having an imidazolidine ring include a 1,3-dialkyl-2-imidazolidyl group and a 1,3-dialkyl-4-imidazolidyl group.

Examples of the groups having a piperazine ring include a 1,4-dialkyl-2-piperazinyl group.

Examples of the groups having a pyrazolidine ring include a 1,2-dialkyl-3-pyrazolidyl group and a 1,2-dialkyl-4-pyrazolidyl group.

Examples of the nitrogen-containing alicyclic heterocyclic groups having a nitrogen atom and an oxygen atom as hetero atoms constituting the ring include a group having a morpholine ring, a group having an isoxazolidine ring, etc.

Examples of the groups having a morpholine ring include an N-alkyl-2-morpholino group and an N-alkyl-3-morpholino group.

Examples of the groups having an isoxazolidine ring include an N-alkyl-3-isoxazolidinyl group, an N-alkyl-4-isoxazolidinyl group and an N-alkyl-5-isoxazolidinyl group.

Examples of the nitrogen-containing alicyclic heterocyclic groups having a nitrogen atom and a sulfur atom as hetero atoms constituting the ring include a group having a thiomorpholine ring and a group having an isothiazolidine ring.

Examples of the groups having a thiomorpholine ring include an N-alkyl-2-thiomorpholino group and an N-alkyl-3-thiomorpholino group.

Examples of the groups having an isothiazolidine ring include an N-alkyl-3-isothiazolidinyl group, an N-alkyl-4-isothiazolidinyl group and an N-alkyl-5-isothiazolidinyl group.

Examples of the nitrogen-containing aromatic heterocyclic groups of A include a group having a nitrogen atom alone as a hetero atom constituting the ring, a group having a nitrogen atom and an oxygen atom as hetero atoms constituting the ring, and a group having a nitrogen atom and a sulfur atom as hetero atoms constituting the ring.

Examples of the nitrogen-containing aromatic heterocyclic group having a nitrogen atom alone as a hetero atom constituting the ring include a group having a pyrrole ring, a group having an imidazole ring, a group having a pyrazole ring, a group having a pyridine ring, a group having a pyridazine ring, a group having a pyrimidine ring, a group having a pyrazine ring, a group having a quinoline ring, a group having an isoquinoline ring, a group having a cinnoline ring, a group having a quinazoline ring, a group having a phthalazine ring, etc.

Examples of the groups having a pyrrole ring include a 2-pyrrolyl group, a 3-pyrrolyl group, a 2-(N-methylpyrrolyl) group and a 3-(N-methylpyrrolyl) group.

Examples of the groups having an imidazole ring include a 2-imidazolyl group, a 4-imidazolyl group, a 5-imidazolyl group, a 2-(N-methylimidazolyl) group, a 4-(N-methylimidazolyl) group and a 5-(N-methylimidazolyl) group.

Examples of the groups having a pyrazole ring include a 3-pyrazolyl group, a 4-pyrazolyl group, a 5-pyrazolyl group, a 3-(N-methylpyrazolyl) group, a 4-(N-methylpyrazolyl) group and a 5-(N-methylpyrazolyl) group.

Examples of the groups having a pyridine ring include a 2-pyridyl group, a 3-pyridyl group and a 4-pyridyl group.

Examples of the groups having a pyridazine ring include a 3-pyridazyl group and a 4-pyridazyl group.

Examples of the groups having a pyrimidine ring include a 2-pyrimidyl group, a 4-pyrimidyl group and a 5-pyrimidyl group.

Examples of the groups having a pyrazine ring include a 2-pyrazyl group.

Examples of the groups having a quinoline ring include a 2-quinolyl group, a 3-quinolyl group, a 4-quinolyl group, a 5-quinolyl group, a 6-quinolyl group, a 7-quinolyl group and an 8-quinolyl group.

Examples of the groups having an isoquinoline ring include a 1-isoquinolyl group, a 3-isoquinolyl group, a 4-isoquinolyl group, a 5-isoquinolyl group, a 6-isoquinolyl group, a 7-isoquinolyl group and an 8-isoquinolyl group.

Examples of the groups having a cinnoline ring include a 3-cinnolinyl group, a 4-cinnolinyl group, a 5-cinnolinyl group, a 6-cinnolinyl group, a 7-cinnolinyl group and an 8-cinnolinyl group.

Examples of the groups having a quinazoline ring include a 2-quinazolinyl group, a 4-quinazolinyl group, a 5-quinazolinyl group, a 6-quinazolinyl group, a 7-quinazolinyl group and an 8-quinazolinyl group.

Examples of the groups having a phthaladine ring include a 1-phthalazinyl group, a 5-phthalazinyl group and a 6-phthalazinyl group.

As the nitrogen-containing aromatic heterocyclic group having a nitrogen atom alone as a hetero atom constituting the ring, the group having an imidazole ring, the group having a pyridine ring and the group having a quinoline ring are preferable.

Examples of the nitrogen-containing aromatic heterocyclic groups having a nitrogen atom and an oxygen atom as hetero atoms constituting the ring include a group having an oxazole ring, a group having an isoxazole ring, etc.

Examples of the groups having an oxazole ring include a 2-oxazolyl group, a 4-oxazolyl group and a 5-oxazolyl group.

Examples of the groups having an isoxazole ring include a 3-isoxazolyl group, a 4-isoxazolyl group and a 5-isoxazolyl group.

As the nitrogen-containing aromatic heterocyclic group having a nitrogen atom and an oxygen atom as hetero atoms constituting the ring, the group having an oxazole ring is preferable.

Examples of the nitrogen-containing aromatic heterocyclic groups having a nitrogen atom and a sulfur atom as hetero atoms constituting the ring include a group having a thiazole ring, a group having an isothiazole ring, etc.

Examples of the groups having a thiazole ring include a 2-thiazolyl group, a 4-thiazolyl group and a 5-thiazolyl group.

Examples of the groups having an isothiazole ring include a 3-isothiazolyl group, a 4-isothiazolyl group and a 5-isothiazolyl group.

As the nitrogen-containing aromatic heterocyclic groups having a nitrogen atom and a sulfur atom as hetero atoms constituting the ring, the group having a thiazole ring is preferable.

As the nitrogen-containing heterocyclic group of A, the nitrogen-containing aromatic heterocyclic group is preferable, the nitrogen-containing aromatic heterocyclic group having a nitrogen atom alone as a hetero atom constituting the ring is more preferable, the group having an imidazole ring, the group having a pyridine ring and the group having a quinoline ring are yet more preferable, and the group having a pyridine ring is particularly preferable.

Examples of the compounds represented by Formula (1) in which $R^{11}$ is a hydrogen atom include
1-vinylimidazole,
N-methyl-2-vinylimidazole,
N-methyl-4-vinylimidazole,
N-methyl-5-vinylimidazole,
2-vinylpyridine,
3-vinylpyridine,
4-vinylpyridine,
2-vinylquinoline,
3-vinylquinoline, and
4-vinylquinoline.

Examples of the compounds represented by Formula (1) in which $R^{11}$ is a methyl group include
1-isopropenylimidazole,
N-methyl-2-isopropenylimidazole,
N-methyl-4-isopropenylimidazole,
N-methyl-5-isopropenylimidazole,
2-isopropenylpyridine,
3-isopropenylpyridine,
4-isopropenylpyridine,
2-isopropenylquinoline,
3-isopropenylquinoline, and
4-isopropenylquinoline.

Examples of the compounds represented by Formula (1) in which $R^{11}$ is a vinyl group include
N-methyl-2-(1-methylene-2-propenyl)aziridine,
N-methyl-2-(1-methylene-2-propenyl)pyrrolidine,
N-methyl-3-(1-methylene-2-propenyl)pyrrolidine,
N-methyl-2-(1-methylene-2-propenyl)hexamethyleneimine,
N-methyl-3-(1-methylene-2-propenyl)hexamethyleneimine,
N-methyl-4-(1-methylene-2-propenyl)hexamethyleneimine,
1-(1-methylene-2-propenyl)imidazole,
N-methyl-2-(1-methylene-2-propenyl)imidazole,
N-methyl-4-(1-methylene-2-propenyl)imidazole,
N-methyl-5-(1-methylene-2-propenyl)imidazole,
2-(1-methylene-2-propenyl)pyridine,
3-(1-methylene-2-propenyl)pyridine,
4-(1-methylene-2-propenyl)pyridine,
2-(1-methylene-2-propenyl)quinoline,
3-(1-methylene-2-propenyl)quinoline, and
4-(1-methylene-2-propenyl)quinoline.

As the compound represented by Formula (1), a compound in which $R^{11}$ is a hydrogen atom and A is a group having a pyridine ring is preferable, a compound in which $R^{11}$ is a hydrogen atom and A is a pyridyl group is more preferable, and 4-vinyl pyridine is yet more preferable.

$R^{21}$, $R^{22}$ and $R^{23}$ independently represent a hydrocarbyl group or a hydrocarbyloxy group.

Examples of the hydrocarbyl groups of $R^{21}$, $R^{22}$ and $R^{23}$ include an alkyl group such as a methyl group, an ethyl group, a n-propyl group, an isopropyl group, a n-butyl group, a sec-butyl group and a tert-butyl group. The number of carbon atoms of the hydrocarbyl groups is preferably 1 to 10, and more preferably 1 to 3.

As the hydrocarbyl groups of $R^{21}$, $R^{22}$ and $R^{23}$, an alkyl group is preferable, an alkyl group having 1 to 10 carbon atoms is more preferable, an alkyl group having 1 to 3 carbon atoms is yet more preferable, and a methyl group and an ethyl group are particularly preferable.

Examples of the hydrocarbyloxy groups of $R^{21}$, $R^{22}$ and $R^{23}$ include an alkoxy group such as a methoxy group, an ethoxy group, a n-propoxy group, an isopropoxy group, a n-butoxy group, a sec-butoxy group and a tert-butoxy group; an aryloxy group such as a phenoxy group; etc. The number of carbon atoms of the hydrocarbyloxy groups is preferably 1 to 10, and more preferably 1 to 3.

As the hydrocarbyloxy groups of $R^{21}$, $R^{22}$ and $R^{23}$, an alkoxy group is preferable, an alkoxy group having 1 to 10 carbon atoms is more preferable, an alkoxy group having 1 to 3 carbon atoms is yet more preferable, and a methoxy group and an ethoxy group are particularly preferable.

At least one of $R^{21}$, $R^{22}$ and $R^{23}$ is a hydrocarbyloxy group, and, for enhancing fuel economy, preferably at least two of $R^{21}$, $R^{22}$ and $R^{23}$ are hydrocarbyloxy groups, more preferably three of $R^{21}$, $R^{22}$ and $R^{23}$ are hydrocarbyloxy groups.

$R^{24}$ and $R^{25}$ independently represent a hydrogen atom or a hydrocarbyl group that may have a nitrogen atom and/or an oxygen atom, or $R^{24}$ and $R^{25}$ are bonded to represent a hydrocarbylene group that may have a nitrogen atom and/or an oxygen atom, or $R^{24}$ and $R^{25}$ form one group representing a group bonded to a nitrogen atom by a double bond.

In the present specification, the hydrocarbyl group having an X atom represents a group having a structure formed by substituting a hydrogen atom and/or a carbon atom of a hydrocarbyl group by the X atom, and a hydrocarbylene group having an X atom represents a group having a structure formed by substituting a hydrogen atom and/or a carbon atom of a hydrocarbylene group by the X atom. For example, a group having a nitrogen atom includes a group having a structure formed by substituting CH by N. Examples of groups having an oxygen atom include a group having a structure formed by substituting $CH_2$ by O, and a group having a structure formed by substituting two hydrogen atoms by O.

Examples of the hydrocarbyl groups of $R^{24}$ and $R^{25}$ include an alkyl group such as a methyl group, an ethyl group, a n-propyl group, an isopropyl group, a n-butyl group, a sec-butyl group and a tert-butyl group; an alkenyl group such as a vinyl group, an allyl group, a 1-propenyl group and a 1-methylethenyl group; an alkynyl group such as an ethynyl group and a propargyl group; an aryl group such as a phenyl group, a tolyl group and a xylyl group; and an aralkyl group such as a benzyl group.

Examples of the hydrocarbyl groups of $R^{24}$ and $R^{25}$ having a nitrogen atom include a dialkylaminoalkyl group such as a dimethylaminomethyl group, a dimethylaminoethyl group, a dimethylaminopropyl group, a diethylaminomethyl group, a diethylaminoethyl group and a diethylaminopropyl group.

Examples of the hydrocarbyl groups of $R^{24}$ and $R^{25}$ having an oxygen atom include an alkoxyalkyl group such as a methoxymethyl group, a methoxyethyl group, a methoxypropyl group, an ethoxymethyl group, an ethoxyethyl group and an ethoxypropyl group; a monooxacycloalkyl group such as a 2-oxiranyl group, 2-oxetanyl group and a 2-tetrahydrofuranyl group; a dioxacycloalkyl group such as a 2-dioxolanyl group; an alkyl group substituted by such a monooxacycloalkyl group as a glycidyl group or a tetrahydrofurfuryl group; and a 3,4-epoxycyclohexyl group.

In the present specification, the monooxacycloalkyl group represents a group formed by substituting one $CH_2$ of a cycloalkyl group by an oxygen atom. The dioxacycloalkyl group represents a group formed by substituting two ($CH_2$) of a cycloalkyl group by oxygen atoms.

The number of carbon atoms of the hydrocarbyl groups of $R^{24}$ and $R^{25}$ that may have a nitrogen atom and/or an oxygen atom is preferably 1 to 10, and more preferably 1 to 6.

Examples of the groups formed by bonding $R^{24}$ with $R^{25}$ include a hydrocarbylene group, a hydrocarbylene group having a nitrogen atom, a hydrocarbylene group having an oxygen atom, etc. Examples of the hydrocarbylene groups include an alkylene group such as a trimethylene group, a tetramethylene group, a pentamethylene group and a hexamethylene group. Examples of the hydrocarbylene groups having a nitrogen atom include a group represented by —$CH_2CH_2$—NH—$CH_2$—, a group represented by —$CH_2CH_2$—N═CH—, a group represented by —CH═CH—N═CH— and a group represented by —$CH_2CH_2$—NH—$CH_2CH_2$—. Examples of the hydrocarbylene groups having an oxygen atom include a group represented by —$CH_2CH_2$—O—$CH_2CH_2$—.

The number of carbon atoms of the groups formed by combining $R^{24}$ with $R^{25}$ is preferably 2 to 20, and more preferably 2 to 12.

Examples of the groups of $R^{24}$ and $R^{25}$ forming one group bonded to a nitrogen atom by a double bond include a hydrocarbylidene group such as an ethylidene group, a propylidene group, a butylidene group, a 1-methylethylidene group, a 1-methylpropylidene group, a 1,3-dimethylbutylidene group; 4-N,N-dimethylaminobenzylidene group, etc.

The number of carbon atoms of $R^{24}$ and $R^{25}$ forming one group bonded to a nitrogen atom by a double bond is preferably 2 to 20, and more preferably 2 to 12.

As $R^{24}$ and $R^{25}$, a hydrocarbyl group or a hydrocarbylene group formed by bonding $R^{24}$ with $R^{25}$, or a hydrocarbylidene group of $R^{24}$ and $R^{25}$ forming one group bonded to a nitrogen atom by a double bond is preferable, a hydrocarbyl group is more preferable, and an alkyl group is yet more preferable. The alkyl group is preferably a methyl group or an ethyl group.

n is an integer of 1 to 10, preferably 2 to 4, and more preferably 3.

Examples of the compounds represented by Formula (2) in which both $R^{24}$ and $R^{25}$ are alkyl groups include [3-(dialkylamino)propyl]trialkoxysilanes such as [3-(dimethylamino)propyl]trimethoxysilane, [3-(diethylamino)propyl]trimethoxysilane, [3-(ethylmethylamino)propyl]trimethoxysilane, [3-(dimethylamino)propyl]triethoxysilane, [3-(diethylamino)propyl]triethoxysilane, and [3-(ethylmethylamino)propyl]triethoxysilane; [3-(dialkylamino)propyl]alkyldialkoxysilanes such as [3-(dimethylamino)propyl]methyldimethoxysilane, [3-(diethylamino)propyl]methyldimethoxysilane, [3-(ethylmethylamino)propyl]methyldimethoxysilane, [3-(dimethylamino)propyl]ethyldimethoxysilane, [3-(diethylamino)propyl]ethyldimethoxysilane, [3-(ethylmethylamino)propyl]ethyldimethoxysilane, [3-(dimethylamino)propyl]methyldiethoxysilane, [3-(diethylamino)propyl]methyldiethoxysilane, [3-(ethylmethylamino)propyl]methyldiethoxysilane, [3-(dimethylamino)propyl]ethyldiethoxysilane, [3-(diethylamino)propyl]ethyldiethoxysilane, and [3-(ethylmethylamino)propyl]ethyldiethoxysilane; and [3-(dialkylamino)propyl]dialkylalkoxysilanes such as [3-(dimethylamino)propyl]dimethylmethoxysilane, [3-(diethylamino)propyl]dimethylmethoxysilane, [3-(dimethylamino)propyl]diethylmethoxysilane, [3-(diethylamino)propyl]diethylmethoxysilane, [3-(dimethylamino)propyl]dimethylethoxysilane, [3-(diethylamino)propyl]dimethylethoxysilane, [3-(dimethylamino)propyl]diethylethoxysilane, and [3-(diethylamino)propyl]diethylethoxysilane.

Examples of the compounds represented by Formula (2) in which both $R^{24}$ and $R^{25}$ are alkoxyalkyl groups include {3-[bis(alkoxyalkyl)amino]propyl}trialkoxysilanes such as {3-[bis(methoxymethyl)amino]propyl}trimethoxysilane, {3-[bis(ethoxymethyl)amino]propyl}trimethoxysilane, {3-[bis(methoxyethyl)amino]propyl}trimethoxysilane, {3-[bis(ethoxyethyl)amino]propyl}trimethoxysilane, {3-[bis(methoxymethyl)amino]propyl}triethoxysilane, {3-[bis(ethoxymethyl)amino]propyl}triethoxysilane, {3-[bis(methoxyethyl)amino]propyl}triethoxysilane, and {3-[bis(ethoxyethyl)amino]propyl}triethoxysilane; {3-[bis(alkoxyalkyl)amino]propyl}alkyldialkoxysilanes such as
{3-[bis(methoxymethyl)amino]propyl}methyldimethoxysilane,
{3-[bis(ethoxymethyl)amino]propyl}methyldimethoxysilane,
{3-[bis(methoxyethyl)amino]propyl}methyldimethoxysilane,
{3-[bis(ethoxyethyl)amino]propyl}methyldimethoxysilane,
{3-[bis(methoxymethyl)amino]propyl}ethyldimethoxysilane,
{3-[bis(ethoxymethyl)amino]propyl}ethyldimethoxysilane,
{3-[bis(methoxyethyl)amino]propyl}ethyldimethoxysilane,
{3-[bis(ethoxyethyl)amino]propyl}ethyldimethoxysilane,
{3-[bis(methoxymethyl)amino]propyl}methyldiethoxysilane,
{3-[bis(ethoxymethyl)amino]propyl}methyldiethoxysilane,
{3-[bis(methoxyethyl)amino]propyl}methyldiethoxysilane,
{3-[bis(ethoxyethyl)amino]propyl}methyldiethoxysilane,
{3-[bis(methoxymethyl)amino]propyl}ethyldiethoxysilane,
{3-[bis(ethoxymethyl)amino]propyl}ethyldiethoxysilane,
{3-[bis(methoxyethyl)amino]propyl}ethyldiethoxysilane, and
{3-[bis(ethoxyethyl)amino]propyl}ethyldiethoxysilane; and
{3-[bis(alkoxyalkyl)amino]propyl}dialkylalkoxysilanes such as
{3-[bis(methoxymethyl)amino]propyl}dimethylmethoxysilane,
{3-[bis(ethoxymethyl)amino]propyl}dimethylmethoxysilane, {3-[bis(methoxyethyl)amino]propyl}dimethylmethoxysilane,
{3-[bis(ethoxyethyl)amino]propyl}dimethylmethoxysilane,
{3-[bis(methoxymethyl)amino]propyl}diethylmethoxysilane,
{3-[bis(ethoxymethyl)amino]propyl}diethylmethoxysilane,
{3-[bis(methoxyethyl)amino]propyl}diethylmethoxysilane,
{3-[bis(ethoxyethyl)amino]propyl}diethylmethoxysilane,
{3-[bis(methoxymethyl)amino]propyl}dimethylethoxysilane,
{3-[bis(ethoxymethyl)amino]propyl}dimethylethoxysilane,
{3-[bis(methoxyethyl)amino]propyl}dimethylethoxysilane,
{3-[bis(ethoxyethyl)amino]propyl}dimethylethoxysilane,
{3-[bis(methoxymethyl)amino]propyl}diethylethoxysilane,
{3-[bis(ethoxymethyl)amino]propyl}diethylethoxysilane,
{3-[bis(methoxyethyl)amino]propyl}diethylethoxysilane, and
{3-[bis(ethoxyethyl)amino]propyl}diethylethoxysilane.

Examples of the compounds represented by Formula (2) in which both $R^{24}$ and $R^{25}$ are oxiranyl groups include
{3-[di(oxiranyl)amino]propyl}trimethoxysilane,
{3-[di(oxiranyl)amino]propyl}triethoxysilane,
{3-[di(oxiranyl)amino]propyl}methyldimethoxysilane,
{3-[di(oxiranyl)amino]propyl}ethyldimethoxysilane,
{3-[di(oxiranyl)amino]propyl}methyldiethoxysilane,
{3-[di(oxiranyl)amino]propyl}ethyldiethoxysilane,
{3-[di(oxiranyl)amino]propyl}dimethylmethoxysilane,
{3-[di(oxiranyl)amino]propyl}diethylmethoxysilane,
{3-[di(oxiranyl)amino]propyl}dimethylethoxysilane, and
{3-[di(oxiranyl)amino]propyl}diethylethoxysilane.

Examples of the compounds represented by Formula (2) in which both $R^{24}$ and $R^{25}$ are tetrahydrofuranyl groups include
{3-[di(tetrahydrofuranyl)amino]propyl}trimethoxysilane,
{3-[di(tetrahydrofuranyl)amino]propyl}triethoxysilane,
{3-[di(tetrahydrofuranyl)amino]propyl}methyldimethoxysilane,
{3-[di(tetrahydrofuranyl)amino]propyl}ethyldimethoxysilane,
{3-[di(tetrahydrofuranyl)amino]propyl}methyldiethoxysilane,
{3-[di(tetrahydrofuranyl)amino]propyl}ethyldiethoxysilane,
{3-[di(tetrahydrofuranyl)amino]propyl}dimethylmethoxysilane,
{3-[di(tetrahydrofuranyl)amino]propyl}diethylmethoxysilane,
{3-[di(tetrahydrofuranyl)amino]propyl}dimethylethoxysilane, and
{3-[di(tetrahydrofuranyl)amino]propyl}diethylethoxysilane.

Examples of the compounds represented by Formula (2) in which both $R^{24}$ and $R^{25}$ are glycidyl groups include
{3-[di(glycidyl)amino]propyl}trimethoxysilane,
{3-[di(glycidyl)amino]propyl}triethoxysilane,
{3-[di(glycidyl)amino]propyl}methyldimethoxysilane,
{3-[di(glycidyl)amino]propyl}ethyldimethoxysilane,
{3-[di(glycidyl)amino]propyl}methyldiethoxysilane,
{3-[di(glycidyl)amino]propyl}ethyldiethoxysilane,
{3-[di(glycidyl)amino]propyl}dimethylmethoxysilane,
{3-[di(glycidyl)amino]propyl}diethylmethoxysilane,
{3-[di(glycidyl)amino]propyl}dimethylethoxysilane, and
{3-[di(glycidyl)amino]propyl}diethylethoxysilane.

Examples of the compounds represented by Formula (2) in which both $R^{24}$ and $R^{25}$ are tetrahydrofurfuryl groups include
{3-[di(tetrahydrofurfuryl)amino]propyl}trimethoxysilane,
{3-[di(tetrahydrofurfuryl)amino]propyl}triethoxysilane,
{3-[di(tetrahydrofurfuryl)amino]propyl}methyldimethoxysilane,
{3-[di(tetrahydrofurfuryl)amino]propyl}ethyldimethoxysilane,
{3-[di(tetrahydrofurfuryl)amino]propyl}methyldiethoxysilane,
{3-[di(tetrahydrofurfuryl)amino]propyl}ethyldiethoxysilane,
{3-[di(tetrahydrofurfuryl)amino]propyl}dimethylmethoxysilane,
{3-[di(tetrahydrofurfuryl)amino]propyl}diethylmethoxysilane,
{3-[di(tetrahydrofurfuryl)amino]propyl}dimethylethoxysilane, and
{3-[di(tetrahydrofurfuryl)amino]propyl}diethylethoxysilane.

Examples of the compounds represented by Formula (2) in which $R^{24}$ and $R^{25}$ are bonded to each other include
3-(1-piperidinyl)propyltrimethoxysilane,
3-(1-piperidinyl)propyltriethoxysilane,
3-(1-piperidinyl)propylmethyldimethoxysilane,
3-(1-piperidinyl)propylethyldimethoxysilane,
3-(1-piperidinyl)propylmethyldiethoxysilane,
3-(1-piperidinyl)propylethyldiethoxysilane,
3-(1-hexamethyleneimino)propyltrimethoxysilane,
3-(1-hexamethyleneimino)propyltriethoxysilane,
3-(1-hexamethyleneimino)propylmethyldimethoxysilane,
3-(1-hexamethyleneimino)propylethyldimethoxysilane,
3-(1-hexamethyleneimino)propylmethyldiethoxysilane,
3-(1-hexamethyleneimino)propylethyldiethoxysilane,
3-morpholinopropyltrimethoxysilane,
3-morpholinopropyltriethoxysilane,
3-morpholinopropylmethyldimethoxysilane,
3-morpholinopropylethyldimethoxysilane,
3-morpholinopropylmethyldiethoxysilane, and
3-morpholinopropylethyldiethoxysilane.

Examples of the compounds represented by Formula (2) in which $R^{24}$ and $R^{25}$ forming one group bonded to a nitrogen atom by a double bond include
N-(1,3-dimethylbutylidene)-3-(trimethoxysilyl)-1-propaneamine, and
N-(1,3-dimethylbutylidene)-3-(triethoxysilyl)-1-propaneamine.

As the compounds represented by Formula (2), a [3-(dialkylamino)propyl]trialkoxysilane is more preferable, [3-(dimethylamino)propyl]trimethoxysilane, [3-(diethylamino)propyl]trimethoxysilane, [3-(dimethylamino)propyl]triethoxysilane, and [3-(diethylamino)propyl]triethoxysilane are yet more preferable, and [3-(diethylamino)propyl]trimethoxysilane is particularly preferable.

The content of the monomer unit based on the compound represented by Formula (1), relative to 100% by weight of the total amount of the monomer unit in the conjugated diene polymer, is 0.01 to 20% by weight. In order to enhance abrasion resistance, the content is preferably not less than 0.02% by weight, and more preferably not less than 0.05% by weight. Moreover, in order to heighten the fuel economy, it is preferably not more than 2% by weight, and more preferably not more than 1% by weight.

The conjugated diene polymer of the present invention preferably has a monomer unit based on a vinyl aromatic hydrocarbon (a vinyl aromatic hydrocarbon unit), in order to heighten the strength. The vinyl aromatic hydrocarbon includes styrene, α-methylstyrene, vinyltoluene, vinylnaphthalene, divinylbenzene, trivinylbenzene, and divinylnaphthalene. Among them, styrene is preferable.

The content of the vinyl aromatic hydrocarbon unit is, when denoting the total amount of the conjugated diene unit and the vinyl aromatic hydrocarbon unit by 100% by weight, preferably not less than 10% by weight (the content of the conjugated diene unit is not more than 90% by weight), and more preferably not less than 15% by weight (the content of the conjugated diene unit is not more than 85% by weight). Moreover, in order to heighten fuel economy, the content of the vinyl aromatic hydrocarbon unit is preferably not more than 50% by weight (the content of the conjugated diene unit is not less than 50% by weight), and more preferably not more than 45% by weight (the content of the conjugated diene unit is not less than 55% by weight).

In order to enhance abrasion resistance, the total content of the conjugated diene unit, the monomer unit based on the compound represented by Formula (1) and the vinyl aromatic hydrocarbon unit, relative to 100% by weight of the total amount of the monomer unit in the conjugated diene polymer, is preferably not less than 99.9% by weight, more preferably not less than 99.95% by weight, and yet more preferably 100% by weight.

The Mooney viscosity ($ML_{1+4}$) of the conjugated diene polymer of the present invention is preferably not less than 10, and more preferably not less than 20, in order to heighten the strength. Moreover, in order to heighten the processability, it is preferably not more than 200, and more preferably not more than 150. The Mooney viscosity ($ML_{1+4}$) is measured at 100° C. according to JIS K6300 (1994).

The vinyl bond content (proportion of conjugated diene-based 1,2-addition constitutional unit) of the conjugated diene polymer of the present invention is, when denoting the content of the conjugated diene unit by 100% by mol, preferably not more than 80% by mol, and more preferably not more than 70% by mol, in order to heighten the fuel economy. Moreover, in order to heighten grip properties, it is preferably not less than 10% by mol, more preferably not less than 15% by mol, yet more preferably not less than 20% by mol, and particularly preferably not less than 40% by mol. The vinyl bond content is obtained by the absorption intensity near 910 $cm^{-1}$ that is the absorption peak of a vinyl group by infrared spectroscopic analysis.

The molecular weight distribution of the conjugated diene polymer of the present invention is preferably 1.0 to 5.0, and more preferably 1.0 to 1.5, in order to heighten the fuel economy. The molecular weight distribution is obtained by measuring the number average molecular weight (Mn) and the weight average molecular weight (Mw) by a gel permeation chromatography (GPC), and dividing Mw by Mn.

A preferred method for producing the conjugated diene polymer of the present invention is a production method comprising steps A and B:

step A: polymerizing a monomer component containing a conjugated diene and a compound represented by Formula (1) above by an alkali metal catalyst in a hydrocarbon solvent using 0.01 to 20% by weight of the compound represented by Formula (1) (relative to 100% by weight of the total amount of the monomer component used), thereby giving a polymer having the alkali metal derived from the alkali metal catalyst at least at one end of a polymer chain having a monomer unit based on the conjugated diene and a monomer unit based on the compound represented by Formula (1) above.

step B: reacting the polymer obtained in step A and a compound represented by Formula (2) above.

The alkali metal catalyst used in step A includes alkali metals, organic alkali metal compounds, complexes of an alkali metal and a polar compound, oligomers having an alkali metal, etc. The alkali metal includes lithium, sodium, potassium, rubidium, cesium, etc. The organic alkali metal compound includes ethyl lithium, n-propyl lithium, iso-propyl lithium, n-butyl lithium, sec-butyl lithium, t-octyl lithium, n-decyl lithium, phenyl lithium, 2-naphthyl lithium, 2-butylphenyl lithium, 4-phenylbutyl lithium, cyclohexyl lithium, 4-cyclopentyl lithium, dimethylaminopropyl lithium, diethylaminopropyl lithium, t-butyldimethylsilyloxypropyl lithium, N-morpholinopropyl lithium, lithium hexamethyleneimide, lithiumpyrrolidide, lithium piperidide, lithium heptamethyleneimide, lithium dodecamethyleneimide, 1,4-dilithio-2-butene, sodium naphthalenide, sodium biphenylide, potassium naphthalenide, etc. The complex of an alkali metal and a polar compound includes potassium-tetrahydrofuran complex, potassium-diethoxyethane complex, etc., and the oligomer having an alkali metal includes a sodium salt of α-methylstyrene tetramer. Organic lithium compounds or organic sodium compounds are preferable, and organic lithium compounds having 2 to 20 carbon atoms or organic sodium compounds having 2 to 20 carbon atoms are more preferable.

The hydrocarbon solvent used in step A is a solvent that does not deactivate the organic alkali metal compound catalyst, and includes an aliphatic hydrocarbon, an aromatic hydrocarbon, an alicyclic hydrocarbon, etc. The aliphatic hydrocarbon includes propane, n-butane, iso-butane, n-pentane, iso-pentane, n-hexane, propene, 1-butene, iso-butene, trans-2-butene, cis-2-butene, 1-pentene, 2-pentene, 1-hexene, 2-hexene, etc. The aromatic hydrocarbon includes benzene, toluene, xylene, ethylbenzene, and the alicyclic hydrocarbon includes cyclopentane, cyclohexane, etc. These are used in not less than one, and the hydrocarbon solvent may be a mixture of various kinds of components such as industrial hexane. Among them, hydrocarbons having 2 to 12 carbons are preferable.

In step A, a monomer component containing a conjugated diene and a compound represented by Formula (1) is polymerized by an alkali metal catalyst in a hydrocarbon solvent to produce a polymer having the monomer unit based on the conjugated diene and the monomer unit based on the compound represented by Formula (1). The conjugated diene includes 1,3-butadiene, isoprene, 1,3-pentadiene, 2,3-dimethyl-1,3-butadiene, and 1,3-hexadiene. These are used in not less than one. The conjugated diene is preferably 1,3-butadiene or isoprene.

In order to enhance abrasion resistance, the amount of the compound represented by Formula (1) to be used, relative to 100% by weight of the total amount of the monomer components used in the polymerization, is preferably not less than 0.01% by weight, more preferably not less than 0.02% by weight, and yet more preferably not less than 0.05% by weight. Moreover, in order to heighten the fuel economy, it is preferably not more than 20% by weight, more preferably not more than 2% by weight, yet more preferably not more than 1% by weight, and particularly preferably not more than 0.5% by weight.

In step A, as a monomer, a vinyl aromatic hydrocarbon may be polymerized in combination with the conjugated diene and the compound represented by Formula (1). The vinyl aromatic hydrocarbon includes styrene, α-methylstyrene, vinyltoluene, vinylnaphthalene, divinylbenzene, trivinylbenzene, divinylnaphthalene, etc. Among them, styrene is preferable.

The usage amount of the vinyl aromatic hydrocarbon is, when denoting the total usage amount of the conjugated diene and the vinyl aromatic hydrocarbon by 100% by weight, not less than 0% by weight (the usage amount of the conjugated diene is not more than 100% by weight), in order to heighten the strength, preferably not less than 10% by weight (the usage amount of the conjugated diene is not more than 90% by weight), and more preferably not less than 15% by weight (the usage amount of the conjugated diene is not more than 85% by weight). Moreover, in order to heighten the fuel economy, the usage amount of the vinyl aromatic hydrocarbon is preferably not more than 50% by weight (the usage amount of the conjugated diene is not less than 50% by weight), and more preferably not more than 45% by weight (the usage amount of the conjugated diene is not less than 55% by weight).

In order to enhance abrasion resistance, the total amount of the conjugated diene, the compound represented by Formula (1) and the vinyl aromatic hydrocarbon to be used in the polymerization, relative to 100% by weight of the total amount of the monomers used, is preferably not less than 99.9% by weight, more preferably not less than 99.95% by weight, and yet more preferably 100% by weight.

The polymerization reaction may be carried out in the presence of an agent for regulating the vinyl bond amount of the conjugated diene unit, an agent for regulating the distribution of the conjugated diene unit and the constituent units based on monomers other than the conjugated diene in the conjugated diene polymer chain (hereinafter, generally cited as "regulators") etc. As the regulator, ether compounds, tertiary amines, phosphine compounds, etc. can be cited. Examples of the ether compounds include cyclic ethers such as tetrahydrofuran, tetrahydropyran, 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether anisole, etc. Examples of the tertiary amines include triethylamine, tripropylamine, tributylamine, N,N,N',N'-tetramethylethylenediamine, N,N-diethylaniline, pyridine, quinoline, etc. Examples of the phosphine compounds include trimethylphosphine, triethylphosphine, triphenylphosphine, etc. These regulators may be used singly or in a combination of two or more.

The polymerization temperature is preferably 25 to 100° C., more preferably 35 to 90° C., and yet more preferably 50 to 80° C. The polymerization time is preferably 10 minutes to 5 hours.

In step B, the amount of compound of formula (II) that is contacted with the polymer prepared in step A is preferably 0.1 to 3 mol per mol of the alkali metal originating from the organoalkali metal catalyst, more preferably 0.5 to 2 mol, and yet more preferably 0.7 to 1.5 mol.

In step B, the temperature at which the polymer prepared in step A and the compound of formula (II) are contacted is preferably 25° C. to 100° C., more preferably 35° C. to 90° C., and yet more preferably 50° C. to 80° C. The contact time is preferably 60 sec to 5 hours, and more preferably 15 min to 1 hour.

In the production of the present invention, if necessary, a coupling agent may be added to the hydrocarbon solution of the conjugated diene polymer in a period from the start of polymerizing the monomer by the alkali metal catalyst to the end. As the coupling agent, compounds represented by Formula (3) below are cited.

(3)

wherein $R^{31}$ represents an alkyl group, an alkenyl group, a cycloalkenyl group or an aryl group, M represents a silicon atom or a tin atom, L represents a halogen atom or a hydrocarbyloxy group, and a represents an integer of 0 to 2.

Examples of the coupling agents represented by Formula (3) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, diethoxydiethylsilane, etc.

The amount of the coupling agent that may be added is, in order to improve the processability of the conjugated diene polymer, preferably not less than 0.03 mol relative to 1 mol of the alkali metal from the alkali metal catalyst, and more preferably not less than 0.05 mol. And, in order to improve the fuel economy, it is preferably not more than 0.4 mol, and more preferably not more than 0.3 mol.

The conjugated diene polymer can be collected from the hydrocarbon solution of the conjugated diene polymer by known collecting methods. For example, there can be cited (1) a method of adding a coagulant to the hydrocarbon solution of the conjugated diene polymer, and (2) a method of giving steam to the hydrocarbon solution of the conjugated diene polymer, etc. The collected conjugated diene polymer may be dried by a known drying machine such as a band drying machine or an extrusion drying machine.

The conjugated diene polymer of the present invention can be mixed with another polymer component or an additive to be used as a conjugated diene polymer composition.

Examples of the other polymer components include conventional styrene-butadiene copolymer rubber, polybutadiene rubber, butadiene-isoprene copolymer rubber, butyl rubber, etc, and, in addition, natural rubber, ethylene-propylene copolymer, ethylene-octene copolymer, etc. These polymer components may be used singly or in a combination of two or more.

When the conjugated diene polymer of the present invention is mixed with another polymer component, the content of the conjugated diene polymer of the present invention is preferably not less than 10% by weight relative to 100% by weight of the total content of the polymer components (including the content of the conjugated diene polymer), and more preferably not less than 20% by weight in order to enhance abrasion resistance.

As the additive, a known additive may be used, and examples thereof include a reinforcing agent such as silica or carbon black; a silane coupling agent; an extender oil; a vulcanizing agent such as sulfur; a vulcanizing accelerator such as a thiazole-based vulcanizing accelerator, a thiuram-based vulcanizing accelerator, a sulfenamide-based vulcanizing accelerator, a guanidine-based vulcanizing accelerator; a vulcanizing activator such as stearic acid or zinc oxide; an organic peroxide such as dicumyl peroxide or di-tert-butyl peroxide; a filler such as calcium carbonate, talc, alumina, clay, aluminum hydroxide or mica; a processing aid; an antioxidant; and a lubricant.

Examples of the silica include dry silica (anhydrous silicic acid), wet silica (hydrated silicic acid), colloidal silica, precipitated silica, calcium silicate, and aluminum silicate. One type thereof may be used or two or more types thereof may be used in combination. The BET specific surface area of the silica is preferably 50 to 250 m²/g. The BET specific surface area is measured in accordance with ASTM D1993-03. As a commercial product, product names VN3, AQ, ER, and RS-150 manufactured by Tosoh Silica Corporation, product names Zeosil 1115 MP and 1165 MP manufactured by Rhodia, etc. may be used.

Examples of the carbon black include furnace black, acetylene black, thermal black, channel black, and graphite. With regard to the carbon black, channel carbon black such as EPC, MPC, or CC; furnace carbon black such as SAF, ISAF, HAF, MAF, FEF, SRF, GPF, APF, FF, CF, SCF, or ECF; thermal carbon black such as FT or MT; and acetylene carbon black can be cited as examples. One type thereof may be used or two or more types thereof may be used in combination.

The nitrogen adsorption specific surface area ($N_2$_SA) of the carbon black is preferably 5 to 200 $m^2/g$, and the dibutyl phthalate (DBP) absorption of the carbon black is preferably 5 to 300 mL/100 g. The nitrogen adsorption specific surface area is measured in accordance with ASTM D4820-93, and the DBP absorption is measured in accordance with ASTM D2414-93. As a commercial product, product names SEAST 6, SEAST 7HM, and SEAST KH manufactured by Tokai Carbon Co., Ltd., product names CK 3 and Special Black 4A manufactured by Degussa, Inc., etc. may be used.

When a conjugated diene polymer composition is formed by combining a reinforcing agent with the conjugated diene polymer of the present invention, the amount of the reinforcing agent combined, relative to 100 parts by weight of the conjugated diene polymer of the present invention combined, is preferably 10 to 150 parts by weight. From the viewpoint of abrasion resistance and strength, the amount combined is more preferably not less than 20 parts by weight, and yet more preferably not less than 30 parts by weight. From the viewpoint of reinforcement being enhanced, it is more preferably not more than 120 parts by weight, and yet more preferably not more than 100 parts by weight.

When a conjugated diene polymer composition in which a reinforcing agent is combined with the conjugated diene polymer of the present invention is used, from the viewpoint of fuel economy, it is preferable to use silica as a reinforcing agent. The amount of silica combined is preferably not less than 50 parts by weight relative to 100 parts by weight of the total amount of the reinforcing agent combined, and more preferably not less than 70 parts by weight.

In order to enhance fuel economy and abrasion resistance, the weight ratio of the content of silica used as a reinforcing agent and the content of carbon black (content of silica: content of carbon black) is preferably 2:1 to 50:1, and more preferably 5:1 to 20:1.

Examples of the silane coupling agent include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl) disulfide, bis(3-(triethoxysilyl)propyl) tetrasulfide, γ-trimethoxysilylpropyldimethylthiocarbamyl tetrasulfide, and γ-trimethoxysilylpropylbenzothiazyl tetrasulfide. One type thereof may be used or two or more types thereof may be used in combination. As a commercial product, product names Si69 and Si75 manufactured by Degussa, Inc., etc. may be used.

In the case where a conjugated diene polymer composition is to be formed by compounding a silane coupling agent to the conjugated diene polymer of the invention, the content of the silane coupling agent, relative to 100 parts by weight of silica, is preferably 1 to 20 parts by weight, more preferably 2 to 15 parts by weight, and yet more preferably 5 to 10 parts by weight.

Examples of the extender oil include an aromatic mineral oil (viscosity-gravity constant (V.G.C. value) 0.900 to 1.049), a naphthenic mineral oil (V.G.C. value 0.850 to 0.899), and a paraffinic mineral oil (V.G.C. value 0.790 to 0.849). The polycyclic aromatic content of the extender oil is preferably less than 3% by weight, and more preferably less than 1% by weight. The polycyclic aromatic content is measured in accordance with British Institute of Petroleum method 346/92. Furthermore, the aromatic compound content (CA) of the extender oil is preferably not less than 20% by weight. Two or more types of extender oils may be used in combination.

Examples of the sulfur include powder sulfur, precipitated sulfur, colloidal sulfur, insoluble sulfur and highly dispersible sulfur. The amount of sulfur to be compounded, relative to 100 parts by weight of the polymer component, is preferably 0.1 to 15 parts by weight, more preferably 0.3 to 10 parts by weight, and yet more preferably 0.5 to 5 parts by weight.

Examples of the vulcanization accelerator include thiazole-based vulcanization accelerators such as 2-mercaptobenzothiazole, dibenzothiazyl disulfide, and N-cyclohexyl-2-benzothiazylsulfenamide; thiuram-based vulcanization accelerators such as tetramethylthiuram monosulfide and tetramethylthiuram disulfide; sulfenamide-based vulcanization accelerators such as N-cyclohexyl-2-benzothiazolesulfenamide, N-t-butyl-2-benzothiazolesulfenamide, N-oxyethylene-2-benzothiazolesulfenamide, and N,N'-diisopropyl-2-benzothiazolesulfenamide; and guanidine-based vulcanization accelerators such as diphenylguanidine, diorthotolylguanidine and orthotolylbiguanidine. The amount thereof used is preferably 0.1 to 5 parts by weight relative to 100 parts by weight of rubber component, and more preferably 0.2 to 3 parts by weight.

As a method for producing a conjugated diene polymer composition by combining another polymer component, an additive, etc. with the conjugated diene polymer of the present invention, a known method such as, for example, a method in which the components are kneaded by means of a known mixer such as a roll or Banbury mixer can be used.

With regard to kneading conditions, when an additive other than a vulcanizing agent or a vulcanization accelerator is combined, the kneading temperature is preferably 50° C. to 200° C. and more preferably 80° C. to 190° C., and the kneading time is preferably 30 sec to 30 min and more preferably 1 min to 30 min. When a vulcanizing agent or a vulcanization accelerator is combined, the kneading temperature is preferably not more than 100° C., and more preferably room temperature (25° C.) to 80° C. A composition in which a vulcanizing agent or a vulcanization accelerator is combined is preferably used after carrying out a vulcanization treatment such as press vulcanization. The vulcanization temperature is preferably 120° C. to 200° C., and more preferably 140° C. to 180° C.

The conjugated diene polymer and the conjugated diene polymer composition of the present invention have excellent abrasion resistance. The fuel economy is also good.

The conjugated diene polymer and the conjugated diene polymer composition of the present invention are used for tires, shoe soles, flooring materials, vibration-proofing materials, etc., and are particularly suitably used for tires.

The present invention can provide a conjugated diene polymer capable of giving a polymer composition excellent in abrasion resistance, a polymer composition containing the conjugated diene polymer and a reinforcing agent such as silica, and a method for producing the conjugated diene polymer.

EXAMPLES

The present invention is explained below by reference to Examples.

'Normal temperature' in the Examples means 25° C.

Physical properties were evaluated by the following methods.

1. Mooney Viscosity ($ML_{1+4}$)

The Mooney viscosity of a polymer was measured at 100° C. in accordance with JIS K6300 (1994).

2. Vinyl Content (Unit: % by mol)

The vinyl content of a polymer was determined by IR spectroscopy from the absorption intensity at around 910 $cm^{-1}$, which is an absorption peak of a vinyl group.

3. Styrene Unit Content (Unit: % by Weight)

The styrene unit content of a polymer was determined from the refractive index in accordance with JIS K6383 (1995).

4. Molecular Weight Distribution (Mw/Mn)

Weight-average molecular weight (Mw) and number-average molecular weight (Mn) were measured under conditions (1) to (8) below by a gel permeation chromatograph (GPC) method, and the molecular weight distribution (Mw/Mn) of a polymer was determined.

(1) Instrument: HLC-8020 manufactured by Tosoh Corporation
(2) Separation column: GMH-XL (2 columns in tandem) manufactured by Tosoh Corporation
(3) Measurement temperature: 40° C.
(4) Carrier: tetrahydrofuran
(5) Flow rate: 0.6 mL/min
(6) Amount injected: 5 µL
(7) Detector: differential refractometer
(8) Molecular weight standard: standard polystyrene 5. Abrasion Resistance A vulcanized molded body in a ring shape was used as a test piece, and an abrasion amount of 500 rotations to 1500 rotations, an abrasion amount of 1500 rotations to 2500 rotations, and an abrasion amount of 2500 rotations to 3500 rotations were measured using Akron Abrasion Tester (manufactured by Ueshima Seisakusho Co., Ltd.) under the condition of a load of 10 pounds and a test piece rotation number of 300 rpm, and the average thereof was calculated. The smaller this value, the better the abrasion resistance.

6. Fuel Economy

A strip-shaped test piece having a width of 1 or 2 mm and a length of 40 mm was stamped out from a sheet-shaped vulcanized molding and used for testing. The loss tangent (tanδ (70° C.)) at 70° C. of the test piece was measured using a viscoelastometer (Ueshima Seisakusho Co., Ltd.) under conditions of a strain of 1% and a frequency of 10 Hz. The smaller this value, the better the fuel economy.

Example 1

A 20 liter capacity stainless polymerization reactor provided with a stirrer was washed, dried, and flushed with dry nitrogen. Subsequently, the reactor was charged with 10.2 kg of industrial hexane (density: 680 $kg/m^3$), 608 g of 1,3-butadiene, 192 g of styrene, 1.41 g of 4-vinyl pyridine, 6.1 ml of tetrahydrofuran, and 4.0 ml of ethylene glycol diethylether. Subsequently, the reactor was charged with 18.26 mmol of n-butyllithium as a n-hexane solution, thereby initiating the polymerization reaction.

The copolymerization reaction of 1,3-butadiene, styrene and 4-vinyl pyridine was carried out for 3 hours at a stirring speed of 130 rpm and the interior temperature of the reactor of 65° C., while continuously supplying 1,3-butadiene and styrene to the reactor. The amount of 1,3-butadiene supplied was 912 g, and the amount of styrene supplied was 288 g. The amount of 4-vinyl pyridine charged was 0.07% by weight relative to the total amount of monomers charged or supplied to the reactor.

Next, the obtained polymer solution was stirred at a stirring speed of 130 rpm, and 13.42 mmol of [3-(diethylamino)propyl]trimethoxysilane was added to the polymer solution, which was stirred for additional 15 minutes. Next, 20 ml of a hexane solution containing 0.8 ml of methanol was added to the polymer solution, which was stirred for additional 5 minutes.

To the polymer solution, 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.), and 4.0 g of pentaerythrityltetrakis(3-laurylthiopropionate) (trade name: Sumilizer TP-D, manufactured by Sumitomo Chemical Co., Ltd.) were added. Next, the polymer solution was evaporated at normal temperature over 24 hours, which was furthermore dried at 55° C. under reduced pressure for 12 hours, thereby giving a polymer. Table 1 gives the evaluation results of the polymer.

100 parts by weight of the polymer thus obtained, 78.4 parts by weight of silica (trade name: Ultrasil VN3-G, manufactured by Degussa, Inc.), 6.4 parts by weight of a silane coupling agent (trade name: Si69, manufactured by Degussa, Inc.), 6.4 parts by weight of carbon black (trade name: DIABLACK N339, manufactured by Mitsubishi Chemical Corp.), 47.6 parts by weight of an extender oil (trade name: JOMO PROCESS NC-140, manufactured by Japan Energy Corporation), 1.5 parts by weight of an antioxidant (trade name: Antigene 3C, manufactured by Sumitomo Chemical Co., Ltd.), 2 parts by weight of stearic acid, 2 parts by weight of zinc oxide, 1 part by weight of a vulcanizing accelerator (trade name: Soxinol CZ, manufactured by Sumitomo Chemical Co., Ltd.), 1 part by weight of a vulcanizing accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded by means of a Labo Plastomill to prepare a polymer composition. The polymer composition thus obtained was molded into a sheet using 6-inch rolls, and the sheet was vulcanized by heating at 160° C. for 45 minutes, thereby giving a vulcanized sheet. Table 1 gives the evaluation results of the physical properties of the vulcanized sheet.

Example 2

A 20 liter capacity stainless polymerization reactor provided with a stirrer was washed, dried, and flushed with dry nitrogen. Subsequently, the reactor was charged with 10.2 kg of industrial hexane (density: 680 $kg/m^3$), 608 g of 1,3-butadiene, 192 g of styrene, 4.18 g of 4-vinyl pyridine, 6.1 ml of tetrahydrofuran, and 4.0 ml of ethylene glycol diethylether. Subsequently, the reactor was charged with 22.62 mmol of n-butyllithium as a n-hexane solution, thereby initiating the polymerization reaction.

The copolymerization reaction of 1,3-butadiene, styrene and 4-vinyl pyridine was carried out for 3 hours at a stirring speed of 130 rpm and the interior temperature of the reactor of 65° C., while continuously supplying 1,3-butadiene and styrene to the reactor. The amount of 1,3-butadiene supplied was 912 g, and the amount of styrene supplied was 288 g. The amount of 4-vinyl pyridine charged was 0.21% by weight relative to the total amount of monomers charged or supplied to the reactor.

Next, the obtained polymer solution was stirred at a stirring speed of 130 rpm, and 13.26 mmol of [3-(diethylamino)propyl]trimethoxysilane was added to the polymer solution, which was stirred for additional 15 minutes. Next, 20 ml of a hexane solution containing 0.8 ml of methanol was added to the polymer solution, which was stirred for additional 5 minutes.

To the polymer solution, 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.), and 4.0 g of pentaerythrityltetrakis(3-laurylthiopropionate) (trade name: Sumilizer TP-D, manufactured by Sumitomo Chemical Co., Ltd.) were added. Next, the polymer solution was evaporated at normal temperature over 24 hours, which was furthermore dried at 55° C. under reduced pressure for 12 hours, thereby giving a polymer. Table 1 gives the evaluation results of the polymer.

100 parts by weight of the polymer thus obtained, 78.4 parts by weight of silica (trade name: Ultrasil VN3-G, manufactured by Degussa, Inc.), 6.4 parts by weight of a silane coupling agent (trade name: Si69, manufactured by Degussa, Inc.), 6.4 parts by weight of carbon black (trade name: DIABLACK N339, manufactured by Mitsubishi Chemical Corp.), 47.6 parts by weight of an extender oil (trade name: JOMO PROCESS NC-140, manufactured by Japan Energy Corporation), 1.5 parts by weight of an antioxidant (trade name: Antigene 3C, manufactured by Sumitomo Chemical Co., Ltd.), 2 parts by weight of stearic acid, 2 parts by weight of zinc oxide, 1 part by weight of a vulcanizing accelerator (trade name: Soxinol CZ, manufactured by Sumitomo Chemical Co., Ltd.), 1 part by weight of a vulcanizing accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded by means of a Labo Plastomill to prepare a polymer composition. The polymer composition thus obtained was molded into a sheet using 6-inch rolls, and the sheet was vulcanized by heating at 160° C. for 45 minutes, thereby giving a vulcanized sheet. Table 1 gives the evaluation results of the physical properties of the vulcanized sheet.

Comparative Example 1

A 20 liter capacity stainless polymerization reactor provided with a stirrer was washed, dried, and flushed with dry nitrogen. Subsequently, the reactor was charged with 10.2 kg of industrial hexane (density: 680 kg/m$^3$), 547 g of 1,3-butadiene, 173 g of styrene, 6.1 ml of tetrahydrofuran, and 4.7 ml of ethylene glycol diethylether. Subsequently, the reactor was charged with 15.38 mmol of n-butyllithium as a n-hexane solution, thereby initiating the polymerization reaction.

The copolymerization reaction of 1,3-butadiene and styrene was carried out for 3 hours at a stirring speed of 130 rpm and the interior temperature of the reactor of 65° C., while continuously supplying 1,3-butadiene and styrene to the reactor. The amount of 1,3-butadiene supplied was 821 g, and the amount of styrene supplied was 259 g.

Next, the obtained polymer solution was stirred at a stirring speed of 130 rpm, and 12.80 mmol of [3-(diethylamino)propyl]trimethoxysilane was added to the polymer solution, which was stirred for 15 minutes. Next, 20 ml of a hexane solution containing 0.8 ml of methanol was added to the polymer solution, which was stirred for additional 5 minutes.

To the polymer solution, 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.), and 4.0 g of pentaerythrityltetrakis(3-laurylthiopropionate) (trade name: Sumilizer TP-D, manufactured by Sumitomo Chemical Co., Ltd.) were added. Next, the polymer solution was evaporated at normal temperature over 24 hours, which was furthermore dried at 55° C. under reduced pressure for 12 hours, thereby giving a polymer. Table 1 gives the evaluation results of the polymer.

100 parts by weight of the polymer thus obtained, 78.4 parts by weight of silica (trade name: Ultrasil VN3-G, manufactured by Degussa, Inc.), 6.4 parts by weight of a silane coupling agent (trade name: Si69, manufactured by Degussa, Inc.), 6.4 parts by weight of carbon black (trade name: DIABLACK N339, manufactured by Mitsubishi Chemical Corp.), 47.6 parts by weight of an extender oil (trade name: JOMO PROCESS NC-140, manufactured by Japan Energy Corporation), 1.5 parts by weight of an antioxidant (trade name: Antigene 3C, manufactured by Sumitomo Chemical Co., Ltd.), 2 parts by weight of stearic acid, 2 parts by weight of zinc oxide, 1 part by weight of a vulcanizing accelerator (trade name: Soxinol CZ, manufactured by Sumitomo Chemical Co., Ltd.), 1 part by weight of a vulcanizing accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded by means of a Labo Plastomill to prepare a polymer composition. The polymer composition thus obtained was molded into a sheet using 6-inch rolls, and the sheet was vulcanized by heating at 160° C. for 45 minutes, thereby giving a vulcanized sheet. Table 1 gives the evaluation results of the physical properties of the vulcanized sheet.

Comparative Example 2

A 20 liter capacity stainless polymerization reactor provided with a stirrer was washed, dried, and flushed with dry nitrogen. Subsequently, the reactor was charged with 10.2 kg of industrial hexane (density: 680 kg/m$^3$), 608 g of 1,3-butadiene, 192 g of styrene, 1.41 g of 4-vinyl pyridine, 6.1 ml of tetrahydrofuran, and 4.0 ml of ethylene glycol diethylether. Subsequently, the reactor was charged with 18.52 mmol of n-butyllithium as a n-hexane solution, thereby initiating the polymerization reaction.

The copolymerization reaction of 1,3-butadiene, styrene and 4-vinyl pyridine was carried out for 3 hours at a stirring speed of 130 rpm and the interior temperature of the reactor of 65° C., while continuously supplying 1,3-butadiene and styrene to the reactor. The amount of 1,3-butadiene supplied was 912 g, and the amount of styrene supplied was 288 g. The amount of 4-vinyl pyridine charged was 0.07% by weight relative to the total amount of monomers charged or supplied to the reactor.

Next, the obtained polymer solution was stirred at a stirring speed of 130 rpm, and 20 ml of a hexane solution containing 0.8 ml of methanol was added to the polymer solution, which was stirred for additional 5 minutes.

To the polymer solution, 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.), and 4.0 g of pentaerythrityltetrakis(3-laurylthiopropionate) (trade name: Sumilizer TP-D, manufactured by Sumitomo Chemical Co., Ltd.) were added. Next, the polymer solution was evaporated at normal temperature over 24 hours, which was furthermore dried at 55° C. under reduced pressure for 12 hours, thereby giving a polymer. Table 1 gives the evaluation results of the polymer.

100 parts by weight of the polymer thus obtained, 78.4 parts by weight of silica (trade name: Ultrasil VN3-G, manufactured by Degussa, Inc.), 6.4 parts by weight of a silane coupling agent (trade name: Si69, manufactured by Degussa, Inc.), 6.4 parts by weight of carbon black (trade name: DIABLACK N339, manufactured by Mitsubishi Chemical Corp.), 47.6 parts by weight of an extender oil (trade name: JOMO PROCESS NC-140, manufactured by Japan Energy Corporation), 1.5 parts by weight of an antioxidant (trade name: Antigene 3C, manufactured by Sumitomo Chemical Co., Ltd.), 2 parts by weight of stearic acid, 2 parts by weight of zinc oxide, 1 part by weight of a vulcanizing accelerator (trade name: Soxinol CZ, manufactured by Sumitomo Chemical Co., Ltd.), 1 part by weight of a vulcanizing accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded by means of a Labo Plastomill to prepare a polymer composition. The polymer composition thus obtained was molded into a sheet using 6-inch rolls, and the sheet was vulcanized by heating at 160° C. for 45 minutes, thereby giving a vulcanized sheet. Table 1 gives the evaluation results of the physical properties of the vulcanized sheet.

Comparative Example 3

A 20 liter capacity stainless polymerization reactor provided with a stirrer was washed, dried, and flushed with dry nitrogen. Subsequently, the reactor was charged with 10.2 kg of industrial hexane (density: 680 kg/m$^3$), 608 g of 1,3-butadiene, 192 g of styrene, 4.18 g of 4-vinyl pyridine, 6.1 ml of tetrahydrofuran, and 4.0 ml of ethylene glycol diethylether. Subsequently, the reactor was charged with 21.93 mmol of n-butyllithium as a n-hexane solution, thereby initiating the polymerization reaction.

The copolymerization reaction of 1,3-butadiene, styrene and 4-vinyl pyridine was carried out for 3 hours at a stirring speed of 130 rpm and the interior temperature of the reactor of 65° C., while continuously supplying 1,3-butadiene and styrene to the reactor. The amount of 1,3-butadiene supplied was 912 g, and the amount of styrene supplied was 288 g. The amount of 4-vinyl pyridine charged was 0.21% by weight relative to the total amount of monomers charged or supplied to the reactor.

Next, the obtained polymer solution was stirred at a stirring speed of 130 rpm, and 20 ml of a hexane solution containing 0.8 ml of methanol was added to the polymer solution, which was stirred for additional 5 minutes.

To the polymer solution, 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.), and 4.0 g of pentaerythrityltetrakis(3-laurylthiopropionate) (trade name: Sumilizer TP-D, manufactured by Sumitomo Chemical Co., Ltd.) were added. Next, the polymer solution was evaporated at normal temperature over 24 hours, which was furthermore dried at 55° C. under reduced pressure for 12 hours, thereby giving a polymer. Table 1 gives the evaluation results of the polymer.

100 parts by weight of the polymer thus obtained, 78.4 parts by weight of silica (trade name: Ultrasil VN3-G, manufactured by Degussa, Inc.), 6.4 parts by weight of a silane coupling agent (trade name: Si69, manufactured by Degussa, Inc.), 6.4 parts by weight of carbon black (trade name: DIABLACK N339, manufactured by Mitsubishi Chemical Corp.), 47.6 parts by weight of an extender oil (trade name: JOMO PROCESS NC-140, manufactured by Japan Energy Corporation), 1.5 parts by weight of an antioxidant (trade name: Antigene 3C, manufactured by Sumitomo Chemical Co., Ltd.), 2 parts by weight of stearic acid, 2 parts by weight of zinc oxide, 1 part by weight of a vulcanizing accelerator (trade name: Soxinol CZ, manufactured by Sumitomo Chemical Co., Ltd.), 1 part by weight of a vulcanizing accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded by means of a Labo Plastomill to prepare a polymer composition. The polymer composition thus obtained was molded into a sheet using 6-inch rolls, and the sheet was vulcanized by heating at 160° C. for 45 minutes, thereby giving a vulcanized sheet. Table 1 gives the evaluation results of the physical properties of the vulcanized sheet.

TABLE 1

|  |  | Ex. 1 | Ex. 2 | Comp. Ex. 1 | Comp. Ex. 2 | Comp. Ex. 3 |
|---|---|---|---|---|---|---|
| Mooney viscosity | — | 43.7 | 43.8 | 49.4 | 35.9 | 35.7 |
| Vinyl bond content | % by mol | 57.2 | 57.2 | 57.6 | 57.1 | 57.8 |
| Content of styrene unit | % by weight | 24.9 | 24.9 | 24.8 | 24.7 | 24.4 |
| Molecular weight distribution | — | 1.22 | 1.21 | 1.17 | 1.13 | 1.14 |
| Abrasion resistance | mg | 300 | 290 | 350 | 430 | 370 |
| Fuel economy tanδ (70° C.) |  | 0.138 | 0.144 | 0.135 | 0.212 | 0.221 |

The invention claimed is:
1. A method of manufacturing a conjugated diene polymer comprising steps A and B below:

step A: polymerizing a monomer component containing a conjugated diene and a compound represented by Formula (1) below by an alkali metal catalyst in a hydrocarbon solvent using 0.01 to 20% by weight of the compound represented by Formula (1) (relative to 100% by weight of the total amount of the monomer component used), thereby giving a polymer having the alkali metal derived from the alkali metal catalyst at least at one end of a polymer chain having a monomer unit based on the conjugated diene and a monomer unit based on the compound represented by Formula (1) below, and step B: reacting the polymer obtained in step A and a compound represented by Formula (2) below,

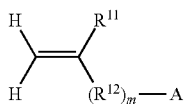

(1)

wherein $R^{11}$ represents a hydrogen atom or a hydrocarbyl group, m is 0 or 1, $R^{12}$ represents a hydrocarbylene group, and A represents a nitrogen-containing heterocyclic group,

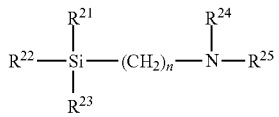

(2)

wherein n represents an integer of 1 to 10; $R^{21}$, $R^{22}$ and $R^{23}$ independently represent a hydrocarbyl group or a hydrocarbyloxy group, and at least one of $R^{21}$, $R^{22}$ and $R^{23}$ is a hydrocarbyloxy group; $R^{24}$ and $R^{25}$ independently represent a hydrogen atom or a hydrocarbyl group that may have a nitrogen atom and/or an oxygen atom, or $R^{24}$ and $R^{25}$ are bonded to represent a hydrocarbylene group that may have a nitrogen atom and/or an oxygen atom, or $R^{24}$ and $R^{25}$ form one group representing a group bonded to a nitrogen atom by a double bond.

2. The method of manufacturing a conjugated diene polymer according to claim 1, wherein, in Formula (2), $R^{21}$, $R^{22}$ and $R^{23}$ are hydrocarbyloxy groups, and $R^{24}$ and $R^{25}$ are hydrocarbyl groups.

3. The method of manufacturing a conjugated diene polymer according to claim 1, wherein, in Formula (1), $R^{11}$ is a hydrogen atom, and A is a pyridyl group.

* * * * *